July 4, 1961  J. W. DODSWORTH ET AL  2,990,931
CARRIAGE SHIFT FOR BUSINESS MACHINES
Filed June 24, 1959  4 Sheets-Sheet 1

*INVENTORS*
JAMES W. DODSWORTH
JACK B. MEISTER
BY Elmer W. Edwards
AGENT

INVENTORS
JAMES W. DODSWORTH
BY JACK B. MEISTER
AGENT

United States Patent Office 2,990,931
Patented July 4, 1961

2,990,931
CARRIAGE SHIFT FOR BUSINESS MACHINES
James W. Dodsworth, Mount Tabor, and Jack B. Meister, Morristown, N.J., assignors to Monroe Calculating Machine Company, Orange, N.J., a corporation of Delaware
Filed June 24, 1959, Ser. No. 822,619
8 Claims. (Cl. 197—177)

The invention relates to business machines or the like and more particularly to improved means for shifting the record carriage of such machines.

In the business machines art it is common practice for shifting the record carriage to provide a rotatable drum upon which the carriage tabulating tape is concentrically wound and to rotate said drum by means of a power spring of the clock or motor type. Such motor springs are customarily designed for providing a constant rate of change in the torque output of the motor from the solid state of the spring to its free condition in operating the tabulating tape drum. Thus the heretofore known spring motor tabulating means impart upon the carriage a constantly varying power load condition in accordance with any change in the tabulated position of the carriage.

To meet different customer requirements record carriages are made in various sizes and may include numerous optional equipment thereon, such as front feed paper devices, automatic line finder, automatic paper ejection, tally roll tapes and others. Thus considerable variations will be found in the mass weight and inertia of the carriage when effecting the shifting operations thereof. Also, many of the program control devices for determining various automatic operations of which such a machine is capable are placed under control of the carriage for selective operation in the displacement of the carriage to certain selective columnar positions. In order to assure that a proper operation of any such devices will be effected in the terminal end tabulated position of the carriage it is necessary therefore to first make an initial adjustment of said spring from the free condition toward its solid condition to store therein sufficient power for control operations in said end position. However, any return movements of the carriage thereafter toward the opposite end position now acts to further wind the motor spring and will cause thereby an excessive power build up within the tabulating means unnecessary to its requirement in effecting operations of the control devices related to the other columnar positions. Thus the said control devices will be subjected in their operation to excessive noise and pounding, together with a wear and tear incident thereto, which is not necessary to the useful purposes thereof.

Again, work applications to which machines of the above character are adapted frequently require that a record carriage be returned by power means automatically following a machine operation in certain selective tabulated columnar positions for returning to other selective columnar positions preceding the first said selective tabulated columnar positions. Such return movements of the carriage are initiated from different tabulated positions and will be of a long or short duration according to the placement of the usual return stop control elements for the carriage, in the manner well known to the art. For such power return operations of the record carriage many of the known machines employ a speed governor control means which is brought into operation for cushioning a stopping action in the latter portion of any carriage return movement, that is, just prior to any particular selective columnar position to which the carriage is to be returned. In other such machines however it may be desired to have the power return means remain effective until after the carriage has fully returned to the selected columnar position. In the latter case the carriage by momentum is permitted to overrun the selected columnar position and subsequently is returned thereto, by means of the usual spring motor tabulating means.

Such complex combination of conditions above set forth relative to carriage weight, selective return starting positions thereof, variable extent of return movements and particularly with the heretofore variations in the torque load applied against carriage return operations at different columnar positions thereof by the previously known spring motor tabulating devices, inter alia, makes for extremely difficult adjustment of the usual automatic power clutch return devices in providing proper power to the needs of all the columnar positions of the carriage. One such difficulty heretofore experienced is that of effecting a proper balance in the power required to provide for the carriage return stroke movements between columnar positions at one end of the range of carriage movement as against the tabulating spring at its higher torque condition while at the same time avoiding an excessive power which might at the opposite end of the range of carriage movement, in which the tabulating means is at a lower torque condition, cause the carriage in a selective return operation to overthrow the intended selective return column and come to rest erroneously in a columnar position preceding the intended stop column.

To avoid such carriage displacement the record forms heretofore include column spacing of sufficient width wherein a maximum carriage return inertia movement following a release of the power return means is spent prior to the carriage reaching a locator stop related to the adjacent preceding tabulating columnar position; the carriage thereafter being returned to the proper columnar position by means of the spring tabulating motor. With respect to certain of the record columns however such an extended excursion not only incurs an unnecessary loss of time but requires also that the record column be wider than the need of the record purpose and thereby reduces paper space otherwise available for use as other record columns.

One object of the present invention therefore is to provide improved spring motor tabulating means adapted for imparting to a record carriage a substantially uniform force for tabulating operations at any position thereof.

Another object of the invention is to provide an improved spring motor tabulating means adapted for effecting power tabulation to a record carriage uniformly throughout the range of shifting operation.

As another object the invention provides means for minimizing torque requirement in a spring motor tabulating means adapted for effecting a carriage tabulation in a plurality of selective columnar positions.

As a further object the invention provides means for spring tabulating a record carriage in a manner to minimize shock, noise and excessive wear upon the usual control mechanisms operated by the carriage in movement to selective columnar positions.

A still further object of the invention provides carriage return column overrun decelerator means including positive limit stop of carriage travel for selective return operations.

Another object of the invention includes manual means selectively settable for disabling said decelerator means whereby the carriage may be manually returned past any selective columnar positions without interruption.

Other objects of the invention will be pointed out in the following description and claims and illustrated in the accompanying drawings, which disclose, by way of example, the principle of the invention and the best mode, which has been contemplated, of applying that principle.

The present invention is shown as applied to a listing calculating machine of well-known type, such as disclosed in U.S. Patent 1,946,572, issued April 28, 1932, to Loring P. Crosman, as modified by U.S. Patent 2,780,407, issued February 5, 1957, to James W. Dodsworth, and insofar as is practicable like parts herein will be numbered in accordance with said patents.

Figure 3:
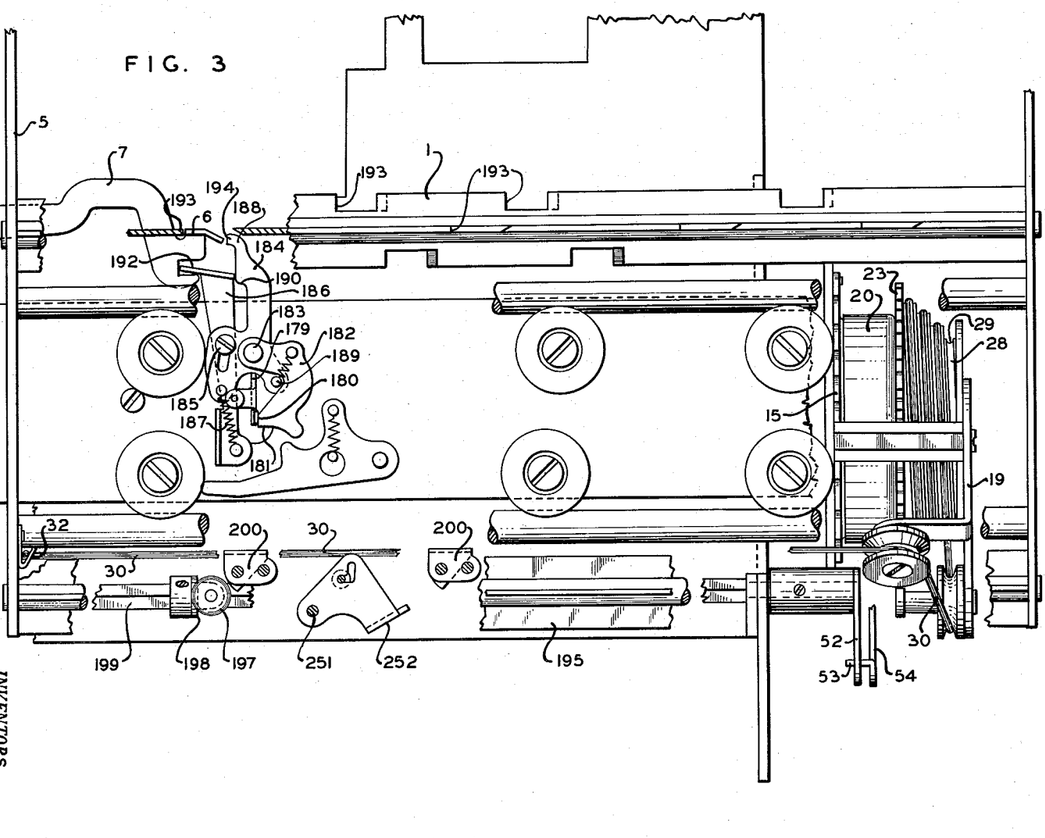
FIG. 3 is a fragmentary rear elevation of the record carriage tabulating release means and showing certain elements for controlling automatic carriage return operations.

As in the manner set forth in said patents a platen carriage 5 (FIG. 1) supported for transverse movement upon the rear framing of the base structure of the machine is held in various tabulating positions by means of a notched bar 1 (FIG. 3) fast within the end frames of the carriage and having the walls of suitable notches forming spaced stops 193 engageable successively by the end 6 of a detent lever 7, suitably fulcrumed upon the rear casing of the machine.

Under normal adjacent column tabulation the detent 7 is disengaged from bar 1 near the end of a machine cycle of operation by the downward movement of a trigger 184, as in the manner hereinafter described and more fully set forth in the above Patent 1,946,572.

Skip column tabulations, in which means for holding and subsequently releasing the detent 7 for reengagement with bar 1 after any of the notches 193 of bar 1 that are not to be effective are carried past the end 6 of detent 7 are also provided, and are fully described in the above patents of reference.

Figure 2:
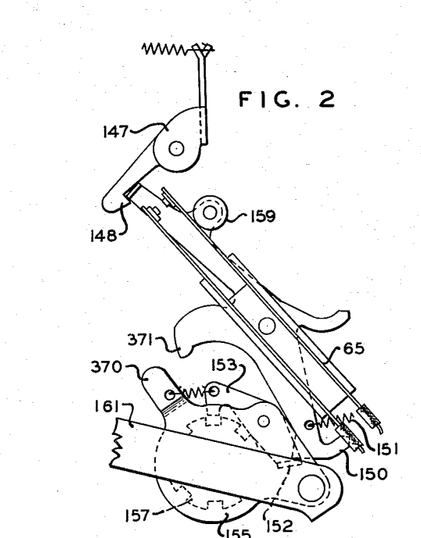
FIG. 2 is a detail right side elevation of the machine cycle clutch control means.

In a manner also fully described in said patents, machine cycles of operation are initiated by an operation of any one of a plurality of suitable motor bars which serve to rock the well-known latch lever 147 (FIG. 2) to disengage the hook end 148 thereof from a clutch release lever 150. Disengagement of hook 148 from lever 150 will cause said lever, under influence of a spring 151, to be rocked out of engagement with the projection 152 of a clutch pawl 153, pivotally mounted upon the crank arm 155, and cause said pawl to be rocked into engagement with a notched disc 157 having suitable drive connections with an electric motor. During said operation of lever 150 an insulated roller 159 mounted thereon will effect engagement of the motor switch 65 and initiate an operting cycle of the machine.

During an operating cycle of the machine, crank arm 155, having link connection 161 with a cam arm 316 (FIG. 1) fast to a transverse shaft 301, will impart reciprocating movement to said cam arm. Arm 316 has link connection 162 with an arm 163 fast to a second transverse shaft 164, so that said movement of the arm 316 is transmitted to the shaft 164. Near the end of a cycle of operation a projection 370 (FIG. 2) of crank arm 155 will contact an arm 371 of lever 150 and rock said lever into the path of movement of the projection 152 of clutch pawl 153 to disengage said pawl from driving disc 157 for terminating the operation.

Pivotally mounted at 165 (FIG. 1) upon a bracket 166, suitably secured to the rear casing of the machine, is a bell crank lever 167 provided with a roller 168, held by tension of a spring 169 against the surface 170 of an arm 171, loosely secured to shouldered hub 172 of an arm 173 fast to the shaft 164. Arm 173 is provided with a pin 174 having engagement with a slotted opening 175 of arm 171. During an operation of shaft 164 by a forward movement of the arm 316 said pin is carried downwardly and arm 171 is allowed to fall away from roller 168 to allow lever 167 to be rocked downwardly by spring 169.

Figure 1:
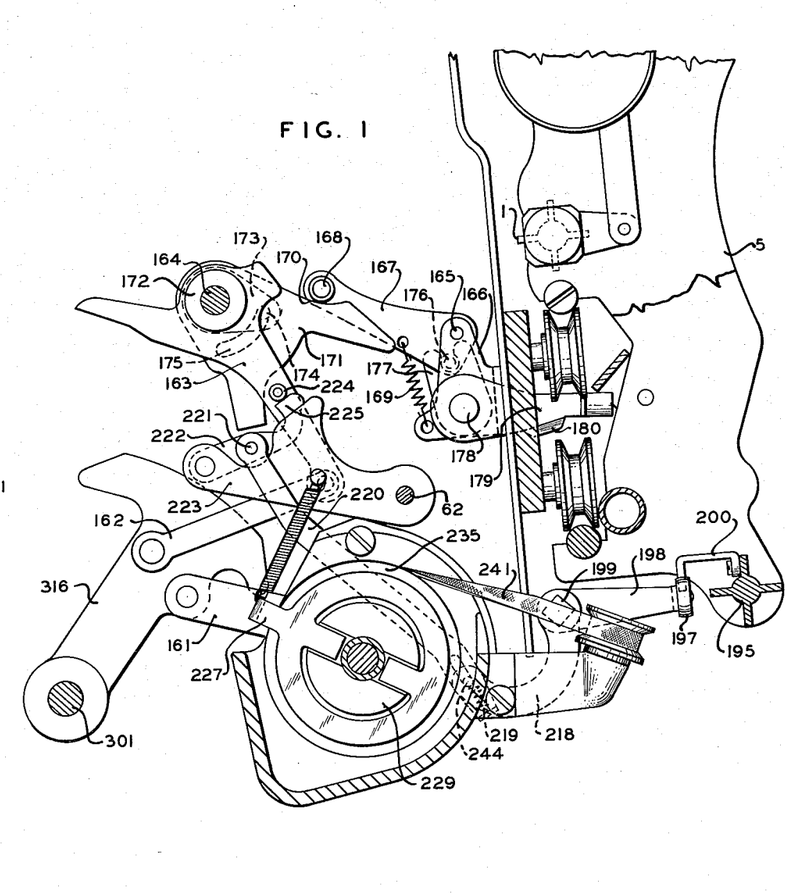
FIG. 1 is a right side elevation of the record carriage and showing control means for effecting tabulating and return movements thereof.

A pin 176 fast to lever 167 has engagement with a lever 177 fast to a short shaft 178 mounted in bracket 166 which pin, during said movement of lever 167, will rock lever 177 and shaft 178 in a clockwise direction, as viewed in FIG. 1.

Secured to the shaft 178 is an arm 179 provided at its free end with a projection 180, adapted during movement of shaft 178 to be moved downwardly into latching engagement with the surface 181 (FIG. 3) of a spring tensioned latch pawl 182.

Upon return movement of arm 316 (FIG. 1), link 162 and arm 163 will rock shaft 164 counterclockwise and pin 174 of arm 173 will lift the lever 171 upwardly to cause the surface 170 of said lever, contacting roller 168, to rock the lever 167 clockwise about point 165, and pin 176 through lever 177 will rock shaft 178 counterclockwise to move the projection 180 of lever 179 upwardly, whereupon said projection being in engagement with the surface 181 (FIG. 3) of latch pawl 182 will lift said pawl bodily.

Pawl 182 is pivotally mounted at 183 upon a trigger 184, secured by pin and slot engagement 185 to a bracket 186 fast to the rear frame of the machine. As pawl 182 is moved upwardly trigger 184 will be carried upwardly therewith and spring 187 will rock said trigger to position its projection 188 above the projection 6 of lever 7. This rocking movement of trigger 184 will cause a stud 189 fast to said trigger to disengage the pawl 182 from projection 180 of lever 179 whereupon spring 187 will draw trigger 184 downwardly until stopped by surface 190 contacting a projection 192 of the bracket 186. Downward movement of trigger 184 will cause projection 188 to disengage the projection 6 of lever 7 from the program bar 1 (securing the carriage in columnar position as previously described) whereupon the carriage being now released is free to move.

Heretofore it was common practice to effect the carriage tabulating movement by means of a tape having one end thereof fast to the carriage while the opposite end thereof is wound in substantially concentric overlapping circles upon a spring powered drum, in well known manner. Such an arrangement however incurs a constantly changing torque to the carriage shifting operations which presents certain disadvantages, as earlier set forth. In the present instance however following the above described release the carriage will now be tabulated under influence of a novel spring power means in the manner to be described and until stopped by the projection 6 engaging with one of the stop notches 193 of bar 1, corresponding to a subsequent columnar position. During any engagement of projection 6 with a notch 193 the said notch will also act to contact the surface 194 of trigger 184 to rock said trigger from the projection 192 of bracket 186 and free projection 188 from projection 6 of the detent 7.

*Uniform torque tabulating means*

Figure 4:
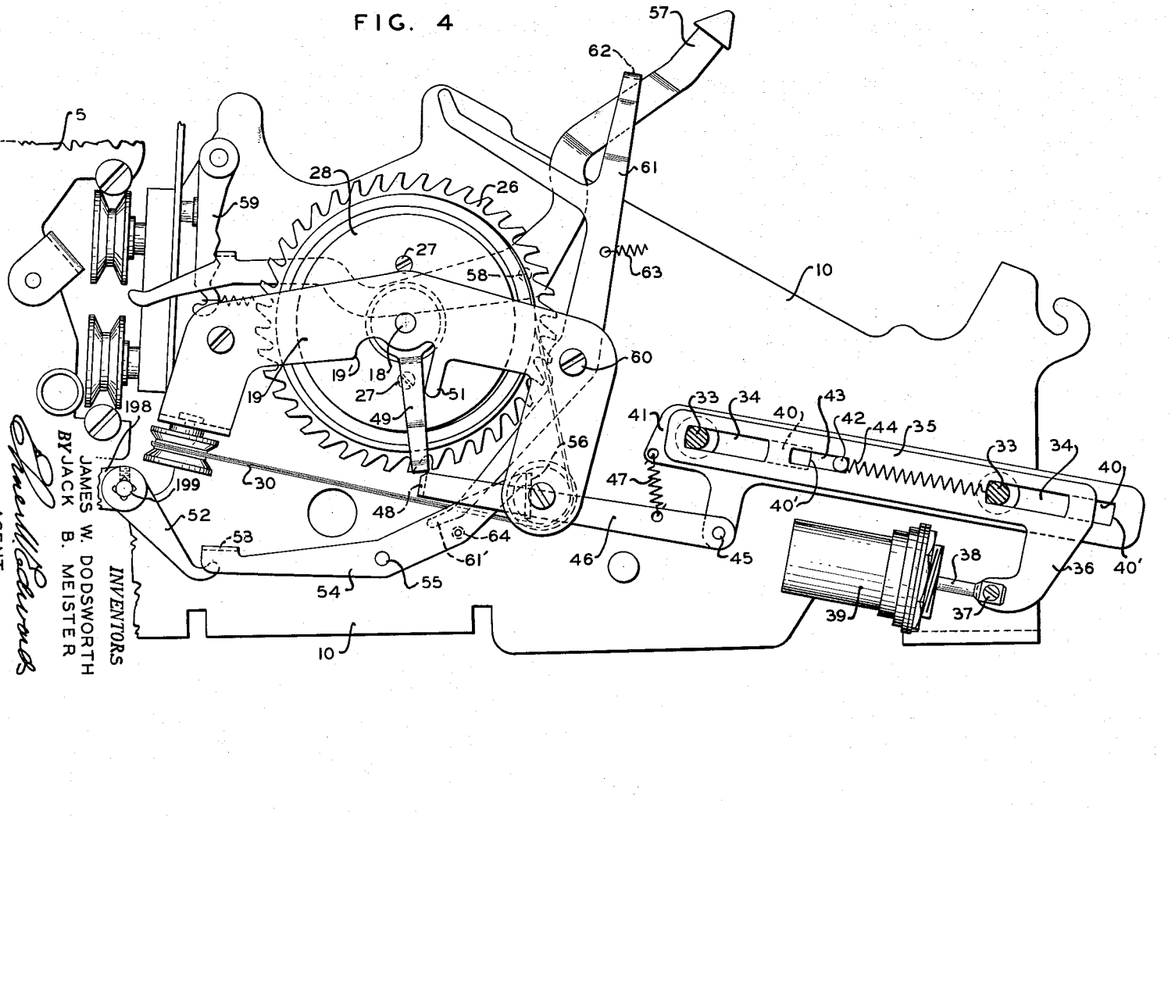
FIG. 4 is a left side elevation, showing the carriage tabulating means and return column overrun control means.

To the left side frame 10 (FIG. 5) is secured a flanged bearing 11 having a shoulder 12 upon which is rotatably mounted a disc 13. Secured to said disc by means of screw studs 14 is a ratchet wheel 15, the hub 16 spun thereto being provided with a shoulder 17 bearinged within a suitable recess of the bearing 11. Extending within a central orifice of hub 16 is one end of a reduced diameter portion 18' of a shaft 18, bearing at its opposite end within a suitable bracket 19, secured to the side frame 10 (FIG. 4). Mounted for rotation upon said reduced portion 18' of shaft 18 and being adjacent the hub 16 is a cupped disc 20 forming a rotatable housing motored by a spiral spring 21. Motor spring 21 has one end anchored to the inner surface of the flanged portion of said housing and the opposite end thereof anchored to a suitable tooth of the hub 16 for the ratchet wheel 15. So that an adjustment may be effected for imparting an initial torque to the spring motor 21 a ratchet pawl 23, pivoted at 22 (FIG. 7) to the left side framing of the machine, cooperates in known manner with the teeth 24 of the ratchet wheel 15 whereby to permit a counterclockwise rotation only of said wheel and the hub 16.

Fast to the motor disc 20 (FIG. 5), to project outwardly from the left side face thereof, is a pair of internally threaded studs 25 which serve as a drive connection between the said motor disc and a ratchet wheel 26 mounted for rotation upon the left-hand end of the reduced portion 18' of shaft 18. Mounted for rotation with disc 20 and ratchet wheel 26, by means of screws 27 within said threaded studs 25, is a cone shaped drum 28 upon the peripheral surface of which is cut a groove 29 forming a volute curved track adapted for receiving a tabulating cord 30. One end of cord 30 is anchored to the cone drum 28 through means of a suitable slot 31 (FIG. 6) cut within the maximal rim of the cone, and the opposite end of said cord is suitably secured at 32 (FIG. 3) to the opposite side carriage end frame 5.

In practice ratchet wheel 15 is first manually rotated in a counterclockwise direction sufficiently to charge motor spring 21 with an initial desired torque for doing the work required. In the instant case approximately one and one-half turns for charging the motor spring with a two-pound pull is found to be advantageous and provides for any additional winding that might subsequently be necessary in the event of any loss of power, which might occur through normal spring fatigue after repeated carriage tabulations over an extended period of time.

The grooved track 29 is designed in a volute curve adapted to closely compensate for any change in the torque as applied to the cone 28 by the motor spring 21 throughout the range of carriage movement. Thus upon the tabulating cord 30 a uniform pull will be maintained for any movement of the carriage and from any tabulated position. Such an arrangement, among other advantages, serves to minimize the overall torque load required in tabulating a record carriage relative to the columnar positions remote from the tabulating spring drum.

Machines of the character described herein are customarily provided with power means for returning the carriage from certain selective tabulated columnar positions to other selective columnar positions automatically, as determined by means of suitably placed control elements on the record carriage. Such elements are well known to the art and in the instant case include cam shoes 200, 252 (FIG. 3) which act to cooperate with a control roller 197 for programming the carriage operations in the following manner and as more fully set forth in the patents of reference. A plurality of the said cam shoes 200 are spaced upon a flanged bar 195 supported within the end framing of the carriage, each cam being adapted for selective cooperation with roller 197 for depressing an arm 198 and effecting clockwise rotation (FIG. 1) of a transverse shaft 199 pivoted within the base structure of the machine. Fast to the shaft 199 is an arm 218 adapted during the clockwise movement of said shaft to tension a spring 219 secured to one end of a link 220. The opposite end of link 220 is pivotally connected at 221 to a latch 222, pivotally mounted upon a plate 223, pivotally mounted to the framing at 62. Latch 222 is held by tension of spring 219 against a roller 224 fast to the lever 163, and as said lever is rocked during the forward movement of arm 316, in the manner previously described, hook end 225 of said latch will be moved into the path of the return movement of roller 224.

Upon completion of an operating cycle of the machine roller 224 now engages the hook end 225 of latch 222 and will cause the plate 223 to be rocked upwardly about point 62, to engage a suitable friction clutch plate 229 for operating the carriage return tape drum 235, as in the known manner fully set forth in U.S. Patent 1,946,572, to which reference is made for details of structure and operation not herein described. Upon operation of the carriage return clutch a ribbon tape 241 is wound upon drum 235 and will act to return the carriage toward the right, as viewed from the front of the machine, and until stopped by means of any selected one of a plurality of cam shoes 252 which are pivotally mounted at 251 upon the flanged bar 195 of the carriage. Cam shoes 252 are each placed upon the bar 195 in relation to certain selective columnar positions of the record carriage and are adjustable for selective cooperation with roller 197 for terminating carriage return operations in a manner and for a purpose well known to the art, one example being fully set forth in the reference Patent 2,780,407.

Engagement of any cam shoe 252 with roller 197 will act to rock said roller and arm 198 upwardly to impart a counterclockwise (FIG. 1) movement to shaft 199. Counterclockwise movement of shaft 199 will cause a pin 244 fast upon the lever 218 to move link 220 downwardly and disengage hook end 225 from roller 224 to release plate 223, whereupon clutch operating arm 227 releases friction plate 229 from drum 235 for terminating the carriage return operation.

Following the termination of a carriage return movement an active tabulating stop 193 (FIG. 3) of the bar 1 must thereafter engage with detent 7 for locating the carriage in the selected return columnar position. Thus during any return movement an active selected stop notch 193 is carried beyond the end 6 of the detent 7 before a release of the return clutch plate 229 is effected by any of said cams 252 and upon said release the previously described tabulating means will act to restore the carriage in tabulating direction from the partial overstep condition until detent 7 snaps upward into engagement with the selected active one of the notches 193 of the tabulating control bar 1.

In view of the constantly changing torque factor inherent in the previously known spring motor tabulator devices considerable attention to the proper initial adjustment for the carriage power return clutch means has heretofore been required and frequent readjustments thereto have been necessary. Such adjustment is for the purpose of assuring that a provision for overthrow movement of the carriage, with respect to selective ones of the active stop positions as relate to one end of the carriage travel in the higher torque range of the tabulating motor, does not inadvertently cause an excessive overthrow movement of the carriage in relation to any of the stop positions located toward the opposite end return travel of the carriage wherein a lower torque is effected, which could erroneously carry any subsequent adjacent stop 193 into engagement with detent 7 and thus locate the carriage in a misplaced columnar position.

Applicant's novel tabulating means however by providing for a uniform torque throughout any range of carriage movement has greatly simplified such initial adjustment of the return means and minimizes also the need for any subsequent readjustment thereto.

*Carriage overrun control for selective return columns*

While the novel tabulating means of the present invention through reducing the maximum torque loads heretofore required for the motor spring, provides for minimizing any natural overrun of the carriage due to its inertia in the selective return operations, special means are also provided whereby to further control such overrun and to positively restrict the same within a given limit, as will now be described with particular reference to FIGS. 4 and 8.

Secured upon the left side frame 10 is a pair of studs 33 upon which is mounted by means of slotted openings 34 a slide member 35 provided with a downwardly extending arm 36 having pivotal connection 37 with the plunger 38 of the usual well known air type dashpot cushion means 39, mounted fast to the side frame 10. Also mounted upon said studs 33, by means of suitable slotted openings 40, is a slide member 41 adjacent slide 35 and having secured thereon a pin 42 extending laterally through a slotted opening 43 of the slide member 35. Connected at one end to the forward stud 33 and at the opposite end to the pin 42 is a spring 44 biasing slide 41 and thereby also slide 35 into forward position, or to the right as viewed in FIGS. 4 and 8. Pivotally mounted at 45 to the slide 41 is a rearwardly extending arm 46 urged in clockwise direction by means of a suitable spring 47 connected thereto and to the slide member 41. Arm 46 is provided with a laterally extending tooth 48 adapted for engagement, as in the manner to be described, with any one of the teeth of tabulating ratchet wheel 26, following a release of the carriage return clutch devices in terminating the selective return movements of the record carriage earlier described.

Figures 5, 6, 7, 8:
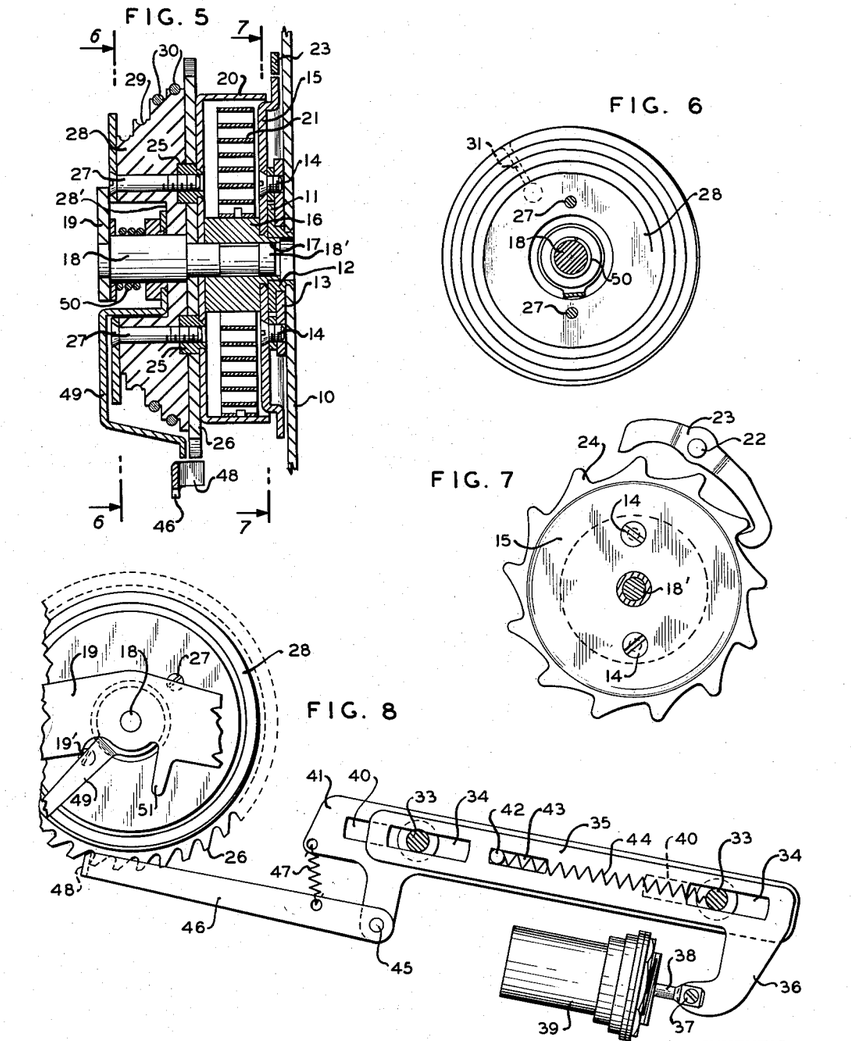
FIG. 5 is a section through the improved spring motor tabulating means.
FIGS. 6 and 7 are detail elevations taken respectively on lines 6—6 and 7—7 of FIG. 5.
FIG. 8 is a left side elevation, showing the return column overrun control means in a partially operated condition.

Loosely mounted upon the support shaft 18 of the spring tabulating means, previously described with reference to FIG. 5, is a downwardly extending lever 49 the distal end of which in the normal position of the parts shown in FIG. 4 is positioned above the tooth 48 of arm 46, whereby said tooth is held downwardly against tension of spring 47 and out of engagement with the teeth of ratchet wheel 26. The lever 49 is held in frictional engagement with a recessed wall 28' of the tabulating drum 28 by means of a compression spring 50 (FIG. 5) supported upon shaft 18 between said lever and the fixed bracket 19. In the counterclockwise operations of drum 28 incident to the regular columnar tabulating operations of the record carriage the lever 49 will be held from frictional rotation therewith by engagement with a suitable projection 51 of the fixed bracket 19. During said operations therefore arm 49 maintains the tooth 48 of arm 46 free of ratcheting engagement with the teeth of the ratchet wheel 26.

It will be recalled that upon depression of the roller arm 198 (FIG. 1) by any one of the cams 200 on the carriage an operation of the control shaft 199 is effected for determining an operation of the carriage return clutch means 235. Said rotation of shaft 199 as viewed in FIG. 4 will be in a counterclockwise direction and during said operation the forward end of an arm 52 fast thereon moves upwardly to engage a lug 53 for imparting a clockwise operation to a lever 54, pivotally mounted at 55 upon side frame 10. The forward end of lever 54 is provided with a lateral projection 56 extending over the top edge of the arm 46 of the decelerator means and during the above operation of lever 54 projection 56 imparts a slight downward movement to arm 46, releasing lug 48 thereof from its engagement with lever 49, above described. It will be apparent therefore that in any subsequent operation of the carriage return clutch, as in the manner earlier described for FIG. 1, the tabulating tape 30 (FIG. 4) in the carriage return movement will act to rotate the drum 28 in a clockwise direction, during which friction spring 50 acts to rotate arm 49 therewith away from cooperative relation with tooth 48 and until stopped by engagement with a projection 19' of the fixed bracket 19.

Thereafter the record carriage continues in the power return operation until any selected cam shoe 252 spaced thereon in relation to a selective columnar position acts to restore control shaft 199 and thereby pull the pawl 225 (FIG. 1) free of its latching engagement with the roller 224 for releasing the return clutch, in the known manner previously described. Following any said release of the power return clutch the carriage however being under momentum will continue in a further return movement until stopped by means of the above described overrun decelerator means in the following manner.

Coincident with the above release of the power return clutch by a restoration of shaft 199 the arm 52 (FIG. 4) on said shaft is rocked downwardly away from the lug 53 of the lever 54 and said lever thereby releases arm 46 for upward movement by its spring 47, whereupon the tooth 48 thereof immediately engages with a tooth of the ratchet wheel 26. As above set forth the tabulating tape 30 during the carriage return movement imparts a clockwise rotation to both drum 28 and ratchet wheel 26, so that tooth 48 engaging said wheel, arm 46 and slide 41 are now moved rearwardly, toward the left in FIG. 4. It will be recalled that the slide 41 has lost motion pin and slot connection 42, 43 with a second slide member 35. Therefore during the first portion of its rearward movement slide 41 moves freely of control operations with respect to dashpot 39 and until pin 42 subsequently picks up slide 35 for movement in the after portion of the movement of slide 41. Thus return operation of the record carriage during such latter movement of slide 41 is first caused to be checked by means of the dashpot 39 and thereafter is stopped in positive manner by the engagement of end surfaces 40' of slots 40 with the support studs 33, as shown in FIG. 8. The return movement being thus terminated the tabulating drum means 28 will now act to impart momentary operation of the carriage in tabulating direction until stopped by the engagement of detent means 7 with the immediate stop notch 193, as in the manner fully set forth earlier in the specification.

From the above description it will be apparent that such arrangement of the carriage selective return column overrun control provides for effecting a release of the return clutch control devices by any control cams 200 before the carriage assumes the added load required in effecting the described operation of the said overrun control devices. This has an overall effect of materially reducing the maximum work load required of the carriage in effecting the described respective operations of said devices.

For certain programs of operations to which machines such as described herein are applicable it may be desired to return the carriage manually directly to an initial starting columnar position from any tabulated position of the carriage. In order therefore that the carriage may be returned without being interrupted at any intermediate columns, as each one of the control cams 200 thereon is moved over the roller 197, special manual control means are provided whereby selectively to disable any engagement of tooth 48 with ratchet wheel 26 of the above described overrun control devices, so that said ratchet wheel remains free for unimpeded rotation in its clockwise direction. For this purpose a manually operable control lever 57 (FIG. 4) is pivotally mounted at 58 upon the left side frame 10 and is held alternatively in either forward or rearward set position by means of a suitable spring click 59. Pivotally mounted at 60 upon support bracket 19 is a lever 61 provided at the upper end thereof with a lug 62 extending laterally of the rearward edge of the manual control lever 57. Lever 61 is biased in clockwise direction by means of a suitable spring 63 and is held by lug 62 with lever 57 in forward set condition so that the lower end 61' of lever 61 will be free of engagement with a pin 64 on the control lever 54 for the arm 46 of the carriage overrun control devices above described.

However, upon any manual adjustment rearwardly of the lever 57 the lever 61 is also rocked rearwardly therewith and engages pin 64 to rock lever 54 in a clockwise direction so that the lug 56 thereof will depress arm 46, whereupon tooth 48 of said arm is now held free of engagement with the ratchet wheel 26 and will thus permit the tabulating means to be rotated freely throughout any return movement of the carriage.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a business machine having at record carriage shiftable selectively in either direction, tabulating means therefor of the type employing a ribbon tape for shifting the carriage in a given direction by means of a motor spring wherein the operating torque varies in accordance with any change of carriage position, and power clutch means for returning the carriage against a pull of the said motor spring; the combination therewith of power modifying means including a tabulating tape drum of conical configuration and having cut within the peripheral diameter thereof a helical groove for the tabulating tape whereby the said drum maintains upon the said tabulating tape a given uniform tension from the motor spring during a shifting operation of the record carriage; control devices operable for effecting an operation of the carriage return clutch following tabulating movements of the record carriage to certain selective columnar stop positions and for automatically releasing the return clutch following return movements of the record carriage to certain selective return columnar stop positions whereby the carriage by momentum will thereafter overrun the selected return columnar stop position, and whereby during any said return stop overrun the tabulating motor spring by means of the power modifying tape drum will effect upon the record carriage a decelerating force of uniform magnitude for any of said selective columnar return positions; and auxiliary means for decelerating the record carriage during any said return stop overrun including a ratchet wheel operable with the said tabulating means, a retarding means associated with said ratchet wheel, an operating member settable for connecting said retarding means with the said ratchet wheel whereby to effect a carriage decelerating operation, and control means for said operating member having frictional engagement for automatic operations with the tabulating means for adjustment to alternative control positions whereby to prevent engagement of the said operating member with said ratchet wheel during tabulating operations of the record carriage and to permit a subsequent engagement thereof in a return operation of the carriage.

2. In a business machine having a record carriage shiftable selectively in either direction, tabulating means therefor of the type employing a ribbon tape for shifting the carriage in a given direction by means of a motor spring wherein the operating torque varies in accordance with any change of carriage position, and power clutch means for returning the carriage against a pull of the said motor spring; the combination therewith of power modifying means including a tabulating tape drum of conical configuration and having cut within the peripheral diameter thereof a helical groove for the tabulating tape whereby the said drum maintains upon the said tabulating tape a given uniform tension from the motor spring during a shifting operation of the record carriage; control devices operable for effecting an operation of the carriage return clutch following tabulating movements of the record carriage to certain selective columnar stop positions and for automatically releasing the return clutch following return movements of the record carriage to certain selective return columnar stop positions whereby the carriage by momentum will thereafter overrun the selected return columnar stop position, and whereby during any said return stop overrun the tabulating motor spring by means of the power modifying tape drum will effect upon the record carriage a decelerating force of uniform magnitude for any of said selective columnar return positions; and auxiliary means for decelerating the record carriage during any said return stop overrun of said carriage including a ratchet wheel operable with the said tabulating means, cushion stop means therefor, an operating member for said cushion stop means, an operating member having lost motion connection for operating the first said operating member, a settable member for connecting the second said operating member with the said ratchet wheel whereby to cause operation of said cushion stop means in effecting a carriage decelerating operation, and control means automatically conditioned by the tabulating means for preventing an operation of said settable member by said ratchet wheel during a tabulating direction of operation and for permitting an operation thereof during a carriage return stop overrun.

3. The invention set forth in claim 2 and including a positive stop means for the said second operating member whereby operation of said auxiliary means will determine a fixed limit for the carriage overrun beyond any said selective return columnar stop position.

4. The invention according to claim 2 including a friction drive means between the said control means and the tabulating means whereby in a tabulating direction of operation the tabulating means will act to adjust the said control means for preventing engagement of said operating member with the said ratchet wheel, and whereby a reverse operation of said tabulating means in effecting a return operation of the carriage will adjust the said control means to an inactive condition relative to the said settable member.

5. In a machine of the class described in combination with a shiftable record carriage employing tabulating tape means including a spring motor and having power means for returning the carriage against an operation of said spring motor; power modifying means between the record carriage and said spring motor including a conical cylinder operable by said spring motor and providing a helical track for the tabulating tape whereby to maintain uniform tabulating power upon the carriage throughout any shifting operations thereof; control devices for said power return means operable automatically by the record carriage for effecting return operations from preselected columnar positions and subsequently restored by the carriage at preselected return stop positions, whereby the carriage by momentum following any said restoration will overrun any said return stop position, and whereby relative to any said return stop position the said power modifying means will provide from the tabulating motor spring a retarding action of a uniform magnitude against the said carriage overrun momentum; and auxiliary means operable for decelerating the record carriage during any said overrun thereof of a return stop position including a ratchet wheel operated by the tabulating means, cushion stop means associated with said ratchet wheel including an operating member therefor, control devices for effecting operations of said cushion stop means upon operations of said ratchet wheel relative to any said return stop overrun of the record carriage and including an operating member having lost motion connection with the first said operating member, the second said operating member including an arm pivoted thereon for selective engagement with any of the teeth of said ratchet wheel, a first control means for said arm including a member automatically adjusted by the tabulating means whereby to hold the said arm free of the ratchet wheel during tabulating operations and to release said arm upon a reverse operation of said ratchet wheel, and a second control means for said arm and normally ineffective thereon during tabulating operations of the record carriage, whereby operation of the power return control devices in effecting a power return operation will adjust the said second control means for said arm whereby to maintain said arm free of cooperation with the ratchet wheel during operations of the power return means, and whereby subsequent restoral of the power return control devices in terminating any carriage return operation will thereupon immediately actuate the cushion stop means whereby to decelerate the carriage movement during a subsequent overrun of any return stop position.

6. The invention according to claim 5 and a manual control means for said arm settable to alternative positions wherein to selectively enable and to disable said operations of said control arm, whereby in the disabled condition thereof the record carriage may be shifted in a continuous return operation freely of operating the said auxiliary decelerating means.

7. In a business machine having a record carriage shiftable selectively in either direction, tabulating means therefor of the type employing a ribbon tape for shifting the carriage in a given direction by means of a motor spring, power clutch means for returning the carriage against a pull of the said motor spring, and control devices operable for effecting an operation of the carriage return clutch following tabulating movements of the record carriage to certain selective columnar stop positions and for automatically releasing the return clutch following return movements of the record carriage to certain selective return columnar stop positions whereby the carriage by momentum will thereafter overrun the selected return stop columnar position against the tension of said motor spring; auxiliary means for decelerating the record carriage during any said return stop overrun including a ratchet wheel operable with the said tabulating means, a retarding means associated with said ratchet wheel, an operating member settable for connecting said retarding means with the said ratchet wheel whereby to effect a carriage decelerating operation, and control means for said operating member having frictional engagement for automatic operations with the tabulating means for adjustment to alternative control positions whereby to prevent engagement of the said operating member with said ratchet wheel during tabulating operations of the record carriage and to permit a subsequent engagement thereof in a return operation of the carriage.

8. In a business machine having a record carriage shiftable selectively in either direction, tabulating means therefor of the type employing a ribbon tape for shifting the carriage in a given direction by means of a motor spring, power clutch means for returning the carriage against a pull of the said motor spring, and control devices operable for effecting an operation of the carriage return clutch following tabulating movements of the record carriage to certain selective columnar stop positions and for automatically releasing the return clutch following return movements of the record carriage to certain selective return columnar stop positions whereby the carriage by momentum will thereafter overrun the selected return stop columnar position against the tension of said motor spring; auxiliary means for decelerating the record carriage during any said return stop overrun of said carriage including a ratchet wheel operable with the said tabulating means, cushion stop means therefor, an operating member for said cushion stop means, an operating member having lost motion connection for operating the first said operating member, a settable member for connecting the second said operating member with the said ratchet wheel whereby to cause operation of said cushion stop means in effecting a carriage decelerating operation, and control means automatically conditioned by the tabulating means for preventing an operation of said settable member by said ratchet wheel during a tabulating direction of operation and for permitting an operation thereof during a carriage return stop overrun.

References Cited in the file of this patent

UNITED STATES PATENTS 2,780,407    Dodsworth _____________ Feb. 5, 1957

FOREIGN PATENTS 247,006    Switzerland ____________ Nov. 1, 1957

UNITED STATES PATENT OFFICE
CERTIFICATE OF CORRECTION

Patent No. 2,990,931            July 4, 1961

James W. Dodsworth et al.

It is hereby certified that error appears in the above numbered patent requiring correction and that the said Letters Patent should read as corrected below.

Colunn 9, line 13, for "at" read -- a --; column 12, line 39, for "Nov. 1, 1957" read -- Nov. 1, 1947 --.

Signed and sealed this 15th day of January 1963.

(SEAL)
Attest:

ERNEST W. SWIDER
Attesting Officer

DAVID L. LADD
Commissioner of Patents